(12) United States Patent
Sheth et al.

(10) Patent No.: US 9,276,863 B2
(45) Date of Patent: Mar. 1, 2016

(54) TRAFFIC DETECTION FUNCTION BASED ON USAGE BASED THRESHOLDS

(71) Applicant: ALCATEL-LUCENT CANADA INC., Ottawa (CA)

(72) Inventors: Tiru K. Sheth, Ottawa (CA); Ivaylo Tanouchev, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 361 days.

(21) Appl. No.: 13/929,873

(22) Filed: Jun. 28, 2013

(65) Prior Publication Data

US 2015/0006723 A1    Jan. 1, 2015

(51) Int. Cl.
   *G06F 15/173*    (2006.01)
   *G06F 15/16*    (2006.01)
   *H04L 12/851*    (2013.01)

(52) U.S. Cl.
   CPC .................. *H04L 47/2425* (2013.01)

(58) Field of Classification Search
   CPC .................................. H04L 47/2425
   USPC ....................................... 709/225
   See application file for complete search history.

(56) References Cited

U.S. PATENT DOCUMENTS

| | | | | |
|---|---|---|---|---|
| 7,039,037 B2 * | 5/2006 | Wang | ...................... | H04L 29/06 370/349 |
| 7,644,158 B2 * | 1/2010 | Ramakrishnan | ........ | H04L 12/14 709/223 |
| 7,991,385 B1 * | 8/2011 | Rosenberg | ........... | G06Q 20/102 370/328 |
| 8,126,428 B2 * | 2/2012 | Gelbman | ................ | H04L 12/14 455/406 |
| 8,144,728 B2 * | 3/2012 | Ahmavaara | ........... | H04M 15/00 370/310 |
| 8,290,471 B1 * | 10/2012 | Jones | ................... | H04L 12/1403 379/111 |
| 8,320,261 B2 * | 11/2012 | Vasamsetti | .............. | H04L 41/12 370/242 |
| 8,351,898 B2 * | 1/2013 | Raleigh | ................... | H04L 12/14 370/328 |
| 8,374,081 B2 * | 2/2013 | Farrugia | .................. | H04L 12/14 370/229 |
| 8,521,889 B2 * | 8/2013 | Anschutz | .............. | H04L 47/785 370/241 |
| 8,607,320 B2 * | 12/2013 | Chan | ..................... | H04L 63/102 726/7 |
| 8,811,363 B2 * | 8/2014 | Velasco | ................ | H04L 12/1403 370/338 |
| 8,898,293 B2 * | 11/2014 | Raleigh | ................. | H04W 48/18 370/219 |
| 8,917,699 B2 * | 12/2014 | Sachs | ................ | H04W 36/0083 370/238 |

(Continued)

OTHER PUBLICATIONS

Rigney, C. et al. "Remote Authentication Dial in User Service (RADIUS)," RFC 2865, Jun. 2000.*

(Continued)

*Primary Examiner* — Melvin H Pollack
(74) *Attorney, Agent, or Firm* — Kramer & Amado, P.C.

(57) ABSTRACT

Various exemplary embodiments relate to a method performed by a policy manager network node in a network, the method including: receiving accounting threshold information relating to an access session associated with an access node; receiving accounting network usage measurement message relating to the access session; determining that a total network usage of the access session exceeds a threshold; and sending a change of authorization message to the access node, wherein the change of authorization message limits a first type of network access, redirects a user of the access node, and allows a second type of network access to continue.

19 Claims, 2 Drawing Sheets

(56) References Cited

U.S. PATENT DOCUMENTS

| | | | | |
|---|---|---|---|---|
| 8,953,592 | B2* | 2/2015 | Krishna | H04L 61/2517 370/389 |
| 8,988,998 | B2* | 3/2015 | Adam | G06F 15/173 370/230 |
| 9,084,179 | B2* | 7/2015 | Visuri | H04W 48/16 |
| 2004/0019539 | A1* | 1/2004 | Raman | H04W 4/24 705/29 |
| 2004/0102182 | A1* | 5/2004 | Reith | H04M 15/00 455/410 |
| 2004/0162998 | A1* | 8/2004 | Tuomi | H04L 63/083 726/3 |
| 2004/0210524 | A1* | 10/2004 | Benenati | G06Q 20/102 705/40 |
| 2005/0108534 | A1* | 5/2005 | Bajikar | G06F 21/606 703/172 |
| 2005/0197867 | A1* | 9/2005 | Edgett | G06Q 10/02 705/5 |
| 2011/0173105 | A1* | 7/2011 | Schirilla | G06Q 20/12 705/34 |
| 2011/0203006 | A1* | 8/2011 | Gopalakrishnan | G06F 21/10 726/29 |
| 2013/0077491 | A1* | 3/2013 | Cherian | H04L 69/22 370/235 |
| 2013/0223421 | A1* | 8/2013 | Gundavelli | H04W 76/022 370/338 |
| 2013/0343269 | A1* | 12/2013 | Evans | H04W 40/02 370/328 |
| 2014/0040975 | A1* | 2/2014 | Raleigh | H04W 12/12 726/1 |
| 2014/0073288 | A1* | 3/2014 | Velasco | H04W 12/06 455/411 |
| 2014/0233380 | A1* | 8/2014 | Kim | H04W 28/24 370/230 |
| 2014/0293829 | A1* | 10/2014 | Visuri | H04L 12/145 370/254 |
| 2014/0329494 | A1* | 11/2014 | Zisimopoulos | H04M 15/66 455/406 |
| 2015/0139056 | A1* | 5/2015 | Wang | H04W 48/08 370/311 |

OTHER PUBLICATIONS

Rigney, C. "RADIUS Accounting," RFC 2866, Jun. 2000.*
Kivinen, T. and McDonald, D. "Heuristics for Detecting ESP-NULL Packets," RFC 5879, May 2010.*
Arkko, J. and Eronen, P. "Improved Extensible Authentication Protocol Method for 3rd Generation Authentication and Key Agreement (EAP-AKA')," RFC 5448, May 2009.*
Narayan, K. and Nelson, D. "Remote Authentication Dial-In User Service (RADIUS) Usage for Simple Network Management Protocol (SNMP) Transport Models," RFC 5608, Aug. 2009.*
Beadles, M. and Mitton, D. "Criteria for Evaluating Network Access Server Protocols," RFC 3169, Sep. 2001.*
Narayan, K. et al. "Using Authentication, Authorization, and Accounting Services to Dynamically Provision View-Based Access Control Model User-to-Group Mappings," RFC 6065, Dec. 2010.*
Zseby, T. et al. "Policy-Based Accounting," RFC 3334, Oct. 2002.*
Caceres, R. et al. "Measurement and Analysis of IP Network Usage and Behavior," IEEE Communications Magazine, vol. 38, Issue 5, Aug. 6, 2002, pp. 141-151.*
Vakali, A. and Pallis, G. "Content Delivery Network: Status and Trends," IEEE Internet Computing, vol. 7, Issue 6, Dec. 8, 2003, pp. 68-74.*

* cited by examiner

TRAFFIC DETECTION FUNCTION BASED ON USAGE BASED THRESHOLDS

TECHNICAL FIELD

Various exemplary embodiments disclosed herein relate generally to communication networks.

BACKGROUND

In current networks a user may access a network via an access node. Such networks may include public networks such as, for example, the internet or private networks such as, for example, an internal corporate network. The user may use the network access to use various application and services, for example, web surfing, messaging, email, streaming audio, stream data, accessing databases, shopping, etc. Often a network access provider, for example an internet service provider (ISP), may limit the network usage of a user based upon a service agreement. When a certain threshold level is reached, for example, 90% the access provider may send a message to the user indicating that the user's usage is nearing its limit and/or the network provider may limit the data bandwidth available to the user. When the user reaches their network usage limit, the network provider may prevent further access of the network and redirect the user and present the user an opportunity to acquire more network usage authorization.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy manager network node in a network, the method including: receiving accounting threshold information relating to an access session associated with an access node; receiving accounting network usage measurement message relating to the access session; determining that a total network usage of the access session exceeds a threshold; and sending a change of authorization message to the access node, wherein the change of authorization message limits a first type of network access, redirects a user of the access node, and allows a second type of network access to continue.

Various exemplary embodiments relate to a method performed by an access node in a network, the method including: sending a request for access to a network; sending an accounting request to a server; receiving a change of authorization message from a policy manager network node; limiting a first type of network access based upon the change of authorization message; redirecting a user of the access node based upon the change of authorization message; and allowing a second type of network access to continue based upon the change of authorization message.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
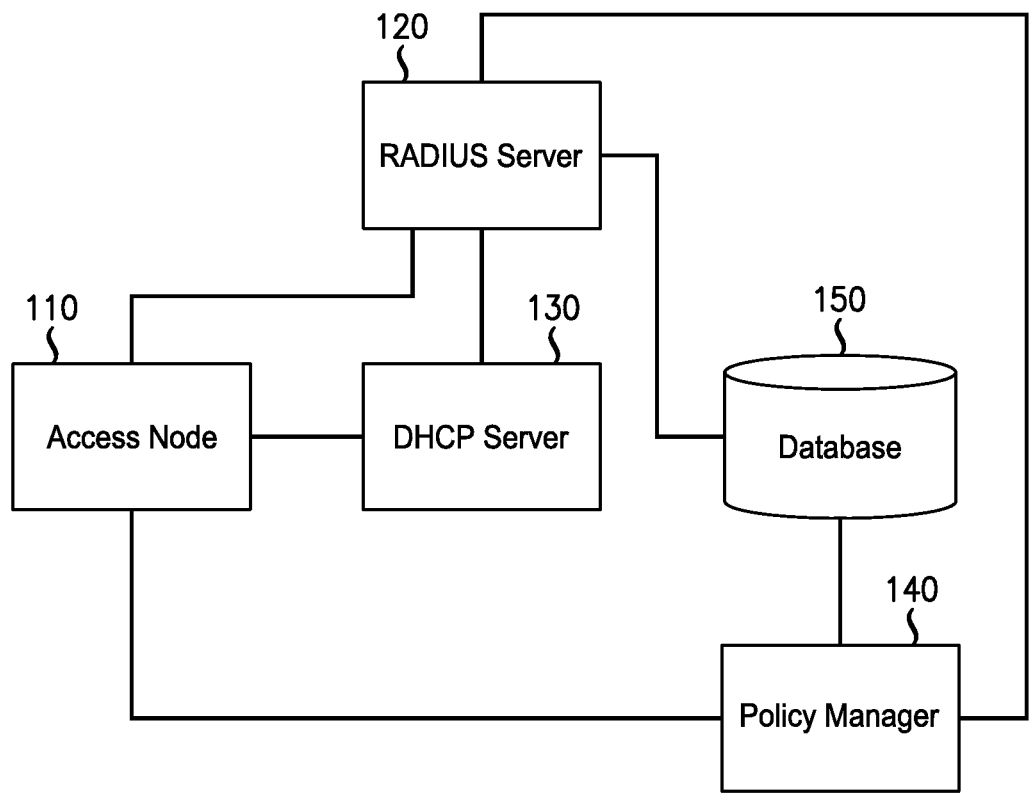
FIG. 1 illustrates an embodiment of a network to implement application assurance.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments may be combined with one or more other embodiments to form new embodiments.

Referring now to the drawings, in which like numerals refer to like components or steps, there are disclosed broad aspects of various exemplary embodiments.

A user may access a network to use various application and services, for example, web surfing, messaging, email, streaming audio, stream data, accessing databases, shopping, etc. As described above, in a network where the user has a network usage limit, the user may reach their limit and lose access to the network until more network usage authorization is acquired. Either the user or the provider of various applications or services may desire to be exempt from the network usage limit, hence providing application assurance, i.e., assuring a user access to a specific application or service independent of network usage limits. For example, a provider of video streaming may pay a network access provider to grant a user unlimited video streaming. Accordingly there remains a need limit access to a first type of network access based upon user limits while allowing a second type of network access to continue. Such application assurance allows a user to continue to access desired applications or services even when the user reaches a network usage limit.

FIG. 1 illustrates an embodiment of a network to implement application assurance. The network 100 includes an access node 110, a RADIUS server 120, a DCHP server 130, a policy manager 140, and a database 170.

The access node 110 provides network access to a user. The access node 110 may be a user device, for example, a personal computer, laptop, smartphone, tablet, etc. Alternatively, the access node 110 may be a server, network router, etc., and a user device may connect to the access node 110 to access the network 100.

The RADIUS server 120 may receive an authentication request from the access node 110. The RADIUS server 120 may exchange authentication information with the database 150 and authenticate the access node. If the authentication is successful, authorization parameters may be fetched, which may include the service level agreement (SLA) profile and subscriber profile which controls the quality of service (QoS) parameters for that user. This information may be supplied in an access accept message.

The DHCP server 130 may provide the internet protocol (IP) configuration for the access node 110.

The policy manager 140 implements various policies that control the user access. The policy manager 140 may set policies related to usage and QoS. The policy manager 140 may also determine if network usage has exceeded any thresholds, and if so, send a policy change request to the access node 110. The policy manager may include an account metering function that may perform usage measurement and analysis for the subscriber and may store the usage measurements and analysis in the database 150. The account metering function may receive information from a traffic detection function (TDF). The TDF receives and analyzes data traffic and detects the various types of traffic included in the data traffic. Deep packet inspection (DPI) is one example of a TDF. The TDF may be implemented in the account metering function, in the access node 110, or in a separate network node not shown.

The database 150 may include subscriber data including identifying and authentication information for the users. The database may also include data for each subscriber related to data rate limits, data usage limits, QoS, etc. Also information related to polices and policy rules may be stored in the database and used by the policy manager 140 to manage the network 100. The database may be implemented using any type of storage.

Figure 2:
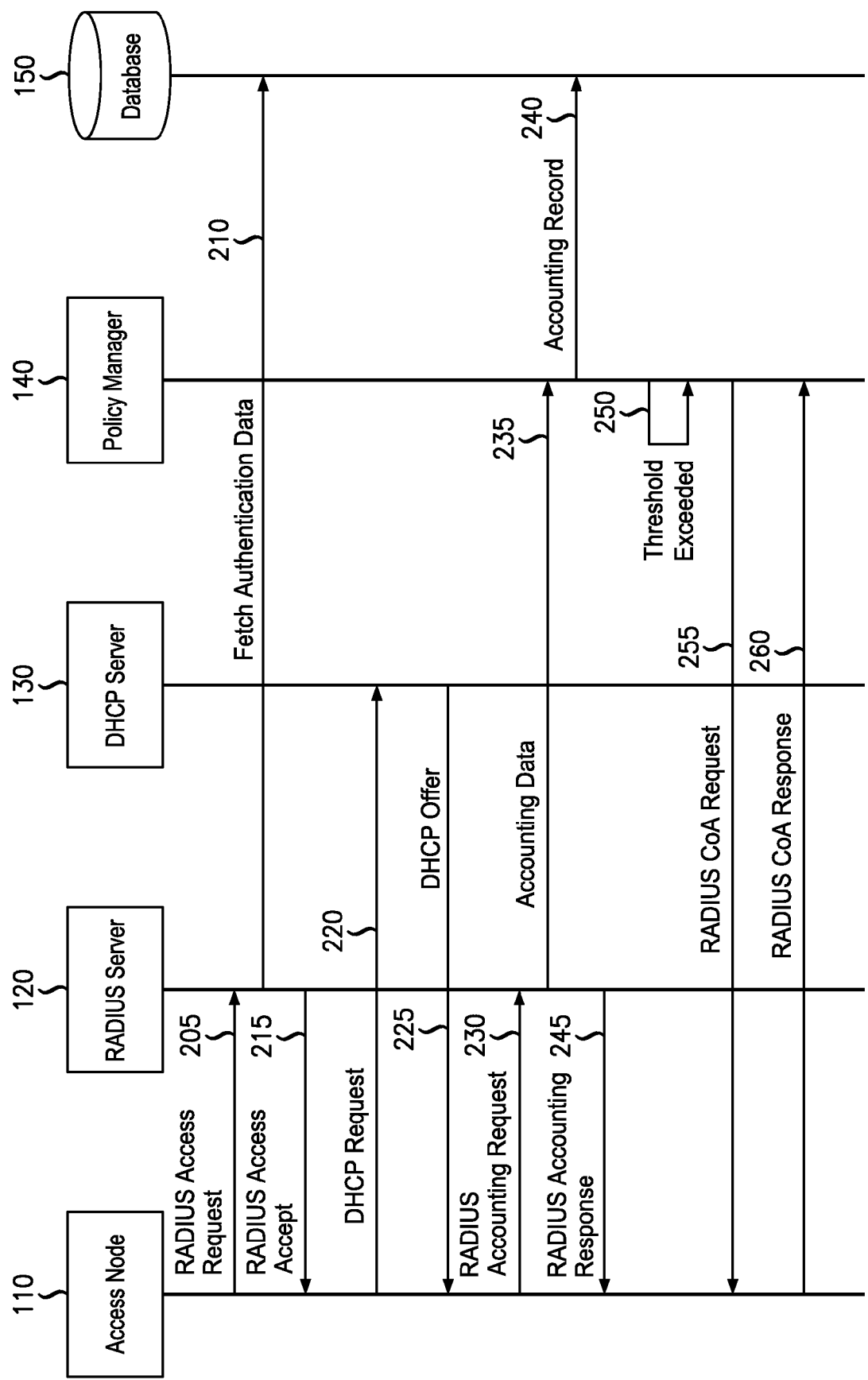
FIG. 2 illustrates an example of messages exchanged between the various elements of the network during operation of the network.

FIG. 2 illustrates an example of messages exchanged between the various elements of the network during operation of the network. FIG. 2 also illustrates the use of RADIUS messages in a wireline network system. First, the access node may authenticate a user. The access node 110 may send a RADIUS access request message 205 to the RADIUS server 120. The RADIUS server 120 may then fetch authentication data 210 from the database 150. The RADIUS server 120 may then authenticate the user based upon the authentication data and the send a RADIUS accept message 215 to the access node 110.

The access node 110 may then send a DHCP request 220 to the DHCP server 130 in order to configure the IP for the access node 110. The DHCP server 130 may the send a DHCP offer message 225 to the access node to complete the IP configuration of the access node 110.

Next, the access node 110 may send a RADIUS accounting request 230 to the RADIUS server 120. Based upon the RADIUS accounting request, the RADIUS server 120 may send accounting data 235 to the accounting metering function in the policy manager 140. The accounting data may describe the specific data to collect and the parameters to measure, for example data usage or QoS. The accounting metering function of the policy manager may then send accounting records 240 to the database 160 that include measured and collected accounting information based upon the accounting information such as, for example, data usage or QoS. The database may store the accounting records for processing by the policy manager 140. The RADIUS server 120 may also send a RADIUS accounting response 245 back to the access node 110.

As the network 100 operates multiple accounting records may be sent to the database 160 for the user of access node 110. The policy manager 140 may accumulate such usage and compare the accumulated usage to various threshold values that may be specified for the user. The threshold values may measure data usage or any other type of network usage, for example, email messages, general web surfing, audio streaming, video streaming, voice/video calling, etc. For any specific type of usage various thresholds may be set. For example, the user may have a limit of 100 Gb of data usage per month. A thresholds may be set at 75%, 90%, and 100% of the 100 Gb data usage limit. When the policy manager 140 determines that a threshold was exceeded, the policy manager 140 then send a RADIUS change of authorization (CoA) request 255 to the access node 110. The access node 110 may send a RADIUS CoA response 260 verifying that it received the RADIUS CoA request. The RADIUS CoA request may include various information that indicates to the access node 110 various actions that may be taken based upon the network usage exceeding a threshold. These various actions are described below.

As described above the accounting metering function of the policy manager 140 may measure various network usage. The accounting metering function of the policy manager 140 may periodically send accounting records to the database 150 where the policy manager 140 may accumulate and analyze network usage. For example, if a user at the access node 110 is surfing the web the policy manager 140 is able to determine the data usage of the user. The policy manager 140 receives and configures usage thresholds for the user.

Once the accumulated usage exceeds the threshold, then the policy manager 140 may send a redirect using a specific application profile. For example, when a 50% threshold is exceeded, the policy manager 140 may send a CoA message that causes an email to be sent to the user indicating that they have used 50% of their authorized network usage. Further, if a 90% threshold is exceeded, the policy manager 140 may send a CoA message that causes the throttling of certain portions of the users data access, for example web surfing and emailing. When a 100% threshold is exceeded, the policy manager 140 may send a CoA message that blocks certain network access and redirects the users to acquire additional network usage authorization. For example, the user may be redirected to a website where they can purchase additional network usage authorization. When either the 90% or 100% thresholds are reached, other sorts of traffic may be allowed to continue to be received by the user, for example, video or audio streaming.

The user at the access node 110 may have an application profile indicating a specific traffic detection function that may be received in a CoA message. This application profile may be used by the access node 110 in order to determine what traffic is authorized for the user. So the application profile may indicate that video streaming traffic and/or voice calling traffic of the user is always allowed. Then once the 100% threshold is reached, the application profile may be updated by the policy manager 140 to redirect the user to another web page where the user makes a decision regarding having reached their network usage limit. The application profiles may specify any combination of types of traffic to limit and also any combination of types of traffic to allow independent of network usage limits.

The policy manager 140 may send application profile updates using the CoA message. The CoA message may include an attribute value pair (AVP) that specifies and defines the application profile. The network operator may define a redirect service with a prefix "AppProfile" that may identity that it is a redirect that may be used when certain traffic is detected. The prefix indicates to the access node 110 that the CoA includes an application profile. Further, the network operator may define a suffix that may map to a TDF policy to be implemented on the access node 110.

The thresholds used to determine network usage may be based upon any type of network usage that the network operator or the user may desire to measure and limit. Any number of thresholds may be used for any type of network usage. Further, there may be independent thresholds for various different types of network usage. For example, data usage for web surfing may have a first set of thresholds and data usage for music streaming may have a second set of thresholds.

Various of the network nodes that are illustrated as separate elements, may also be combined depending upon the specific implement of various embodiments. For example, any of the RADIUS server 120, policy manager 140, and/or the database 150 may be included in the same hardware device depending upon the desired implementation and the available hardware configuration.

It should be apparent from the foregoing description that various exemplary embodiments of the invention may be implemented in hardware and/or software instructions enacted on a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method, performed by a policy manager network node in a network, the method comprising:
    receiving, in the policy manager network node, accounting threshold information relating to an access session associated with an access node;
    receiving, in the policy manager network node, accounting network usage measurement message relating to the access session;
    determining, in the policy manager network node, that a total network usage of the access session exceeds a threshold; and
    sending, in the policy manager network node, a change of authorization message to the access node, wherein the change of authorization message limits a first type of network access, redirects a user of the access node, and allows streaming access to continue independent of network usage limits.

2. The method of claim 1, wherein limiting the first type of network access includes:
    preventing the first type of network access.

3. The method of claim 2, wherein redirecting the user of the access node includes:
    presenting the user an opportunity to acquire additional network usage authorization.

4. The method of claim 1, wherein redirecting the user of the access node includes:
    presenting a user a warning indicating the current total network usage.

5. The method of claim 1, wherein the accounting information includes a first threshold indicating total authorized network usage and a second threshold indicating a total usage less than the total authorized network usage, and, when total network usage exceeds the second threshold but not the first threshold:
    redirecting the user of the access node includes presenting a user a warning indicating the current total network usage, and when total network usage exceeds both the first threshold and the second threshold:
    limiting the first type of network access includes preventing the first type of network access and redirecting the user of the access node includes presenting the user an opportunity to acquire additional network usage authorization.

6. The method of claim 1, wherein the first type of network access includes web surfing and the streaming access includes audio or video streaming.

7. The method of claim 1, further comprising:
    accumulating total network usage of the access session based upon receiving a plurality of accounting network usage measurement messages.

8. The method of claim 1, wherein the change of authorization message includes an application profile that includes redirect information and traffic detection function information.

9. The method of claim 8, wherein the change of authorization message includes a prefix to identify that a redirect may be used when certain traffic is detected.

10. The method of claim 8, wherein the change of authorization message includes a suffix to identify TDF policy to be implemented on the access node.

11. A method performed by an access node in a network, the method comprising:
    sending, from the access node, a request for access to a network;
    sending, from the access node, an accounting request to a server;
    receiving, in the access node, a change of authorization message from a policy manager network node;
    limiting, in the access node, a first type of network access based upon the change of authorization message;
    redirecting, in the access node, a user of the access node based upon the change of authorization message; and
    allowing, in the access node, streaming access to continue independent of network usage limits based upon the change of authorization message.

12. The method of claim 11, wherein limiting the first type of network access includes:
    preventing the first type of network access.

13. The method of claim 12, wherein redirecting the user of the access node includes:
    presenting the user an opportunity to acquire additional network usage authorization.

14. The method of claim 11, wherein redirecting the user of the access node includes:

presenting a user a warning indicating the current total network usage.

15. The method of claim 11, wherein the first type of network access includes web surfing and the streaming access includes audio or video streaming.

16. The method of claim 11, wherein the accounting request is a RADIUS accounting request and the server is a RADIUS server.

17. The method of claim 11, wherein the change of authorization message includes an application profile that includes redirect information and traffic detection function information.

18. The method of claim 17, wherein the change of authorization message includes a prefix to identify that a redirect may be used when certain traffic is detected.

19. The method of claim 17, wherein the change of authorization message includes a suffix to identify TDF policy to be implemented on the access node.

* * * * *